Figure 1:
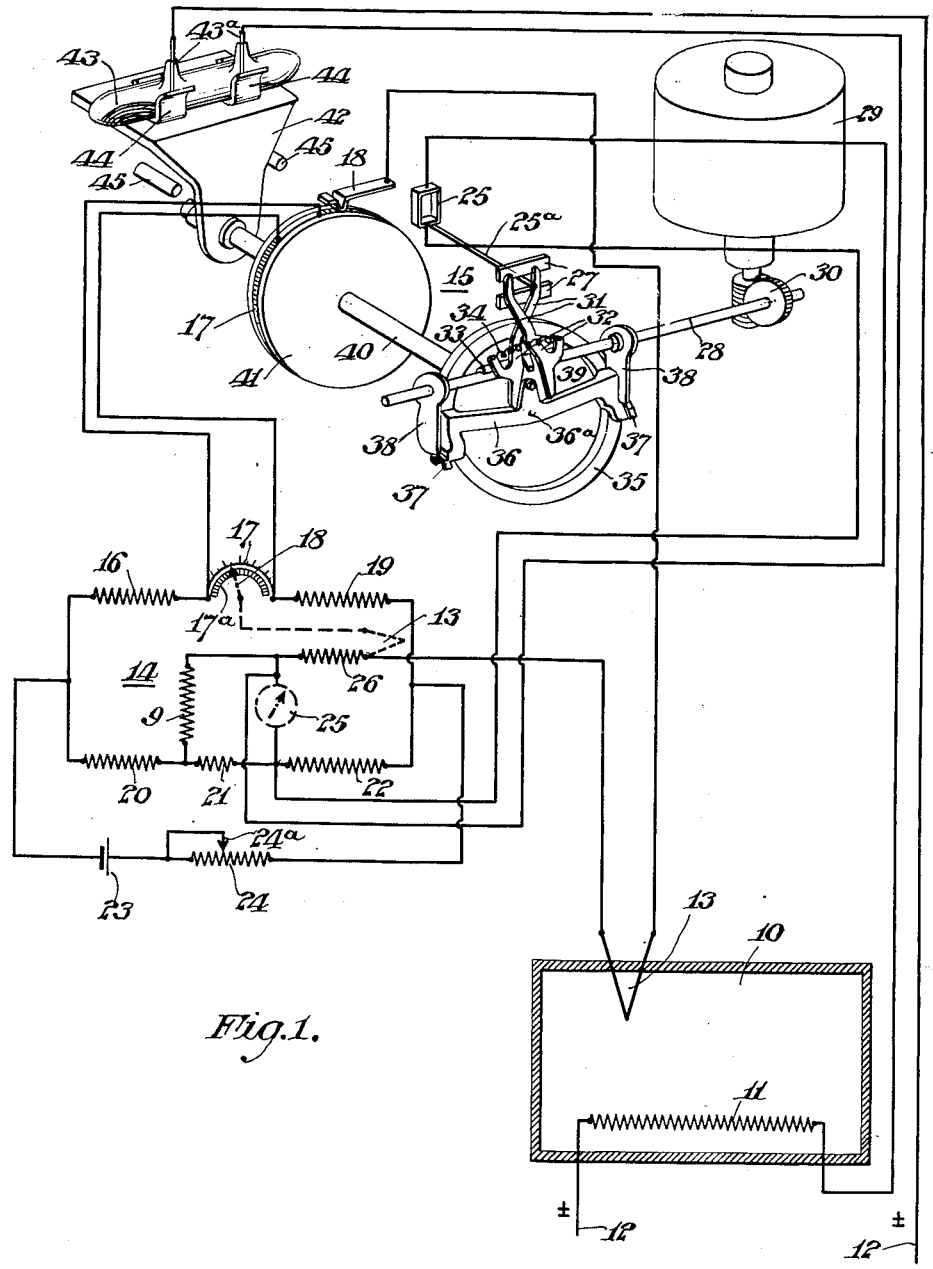

Patented Apr. 4, 1939

2,153,222

UNITED STATES PATENT OFFICE 2,153,222

CONTROL SYSTEM

Felix Wunsch, Philadelphia, Pa., assignor to Leeds and Northrup Company, Philadelphia, Pa., a corporation of Pennsylvania Application November 20, 1934, Serial No. 753,859

22 Claims. (Cl. 236—74)

My invention relates to control systems and more particularly to electrical control systems, including means responsive to a condition to be controlled, in which the control is modified upon the failure of the condition-responsive means.

My invention is particularly suitable for application to control systems utilizing the null method of measuring a condition to be controlled; that is, one in which the device or circuit for measuring or indicating the condition to be controlled is repeatedly rebalanced and in which the movement of the associated rebalancing apparatus is utilized as a measure of the condition under control. In such a system, the failure of any part of the measuring device or circuit resulting in an apparent condition of balance, for example, the opening of the circuit of a thermocouple utilized to measure a temperature under control, tends to result in a complete loss of control, under which circumstances the condition under control may reach excessive or destructive values.

In accordance with my invention, a system for controlling a given condition comprises means for deriving an effect which is a measure of the condition under control, and means including an electro-responsive device for measuring the derived effect, the measuring means in turn controlling, either directly or indirectly through relay apparatus, the condition under control. There is also provided means operative, upon the failure of the condition responsive means, to maintain a current through the electro-responsive device to modify the control of the condition.

More particularly in accordance with one embodiment of my invention, a temperature control system comprises a thermocouple responsive to the temperature to be controlled, an impedance network including an adjustable impedance, and an electro-responsive device, such as a galvanometer, connected to be energized with difference in the unbalance voltage of the network and that generated by the thermocouple. Mechanical relay apparatus controlled by the electro-responsive device periodically resets the adjustable impedance of the network to rebalance the circuit, and a control device movable by and in accordance with movements of the rebalancing mechanism is connected to control the given temperature; for example, the control device may comprise a switch connected in circuit with one or more heating elements of an electric furnace, the temperature of which is under control.

An auxiliary high resistance circuit is connected in parallel to the electro-responsive device and to a point in the network of such a potential as to tend to send through the device a current of the same sense as that due to the thermocouple. During normal operation of the system, this auxiliary circuit produces no flow of current through the electro-responsive device, but merely modifies, to a slight extent, the zero setting of the adjustable impedance of the network. Upon an opening of the thermocouple circuit, however, the electro-responsive device being included in the auxiliary local circuit, the current flows therethrough simulating an unbalance of the network in such a direction as to reduce the heat supplied to the furnace and thus prevent excessive rise of temperature.

For a better understanding of my invention, together with other and further objects thereof, reference is had to the following description taken in connection with the accompanying drawing, and its scope will be pointed out in the appended claims.

The single figure of the drawing is a circuit diagram of a control system embodying my invention, together with a schematic representation of a rebalancing mechanism suitable for use in connection with my control system.

Referring now more particularly to the drawing, there is illustrated a control system embodying my invention for controlling the temperature of a furnace 10 provided with a heating element 11 energized from a supply circuit 12, which may be either alternating current or direct current. The control system comprises essentially a device responsive to the temperature of the furnace 10, such as a thermocouple 13, a measuring circuit 14, and a rebalancing apparatus 15.

The measuring circuit 14 includes a split circuit potentiometer one branch of which is made up of a fixed resistance 16, an adjustable resistance or slidewire 17 provided with an adjustable contact 18, and a fixed resistance 19, while the other branch comprises fixed resistances 21 and 22 and a resistance 20 having a positive temperature coefficient of resistance and serving as a cold junction compensator for the thermocouple 13. A suitable scale 17a may be associated with the slidewire 17 and associated contact 18. A source of current, such as a battery 23, is connected to the two branches above-described, connected in parallel at points of connection to the battery. An adjusting resistance 24, having an adjustable contact 24a, is included in series with the battery 23. Between the adjustable contact 18 and the junction between resistors 21 and 22 are serially connected the thermocouple 13, an electro-responsive device, such as a galvanometer 25, and a resistance 26. For the sake of clarity, the slidewire 17, the thermocouple 13, and the galvanometer 25, which are included in other portions of the system, are in addition shown in dotted lines in the measuring circuit 14.

The measuring circuit 14 may be periodically rebalanced by any of several automatic rebalancing mechanisms well-known in the art, although there is shown, by way of example, a schematic representation of the rebalancing mechanism similar to that disclosed and claimed in U. S. Letters Patent No. 1,935,732, granted November 21, 1933, upon the application of Lloyd Y. Squibb, to which reference is made for a detailed description of the apparatus. In brief, the galvanometer 25 is provided with a deflecting needle 25a movable between a pair of cooperating clamping members 27 intermittently operated into engagement with the needle 25a by suitable mechanism driven by the shaft 28, omitted for the sake of clarity. The shaft 28 is continuously rotated by a motor 29 through gearing 30. Cooperating with the pointer 25a is a pair of scissors-like arms or feelers 31 independently pivoted at the points 32. During that portion of the cycle of rotation of the shaft 28 in which the galvanometer pointer 25a is free to move, the feelers 31 are maintained separated by a suitable cam 33 mounted on and driven by the shaft 28. When released by the cam 33, the feelers 31 are moved together by a suitable biasing spring 34.

The feelers 31 are adapted to control the movement of a secondary member, such as a clutch disk 35, by means of a normally horizontal arm 36 pivoted at 36a and provided at its ends with clutch or brake shoes adjacent the rim of the disk 35, not shown in the drawing. The ends of the arms 36 carry cam surfaces 37 disposed in the path of a pair of cams 38 mounted on the shaft 28. The arm 36 has an upstanding portion carrying a pin 39 disposed for engagement by the lower arms of the members 31. The arm 36 is intermittently raised from engagement with the clutch disk 35 by a cam surface of the cam 33 cooperating with a support for the arm 36 and feelers 31, omitted for the sake of clarity; it is disengaged during that portion of each cycle of rotation of the shaft 28 during which the pointer 25a is clamped between the members 27 and the members 31 are free to move under the influence of the biasing spring 34. The clutch disk 35 is secured to a shaft 40 upon which is mounted also a disk 41 supporting the slidewire 17 with which cooperates the adjustable fixed contact 18. An extension of the shaft 40 carries also a bracket 42 upon which is supported any suitable control device, such as a mercury switch 43, having a pair of terminals 43a and supported from the bracket 42 by means of a pair of spring clips 44.

The general principles of operation of the above-described rebalancing mechanism per se will be well understood by those skilled in the art, or may be found set forth in detail in the above-mentioned Squibb patent. In brief, upon the occurrence of an unbalance of the bridge circuit 14, as described hereinafter, the galvanometer pointer 25a is deflected from its neutral position. During a predetermined portion of the cycle of rotation of the shaft 28, the members 27 are separated by the cam 33 so that the pointer 25a is free to deflect in accordance with the circuit conditions obtaining. After a short interval, adequate for the pointer 25a to assume its final position, the members 27 are operated to engage and clamp the pointer 25a in its deflected position. Simultaneously, the feelers 31 are released, and, if the pointer 25a has deflected as described above, one of the feelers 31 will engage the pointer 25a before the other, when returning to its normally closed position. The spring 34 is then effective to move the other feeler 31 about its respective pivot and the lower arm of that feeler will engage the pin 39 of the arm 36 which is, at this point in the cycle, released from engagement from the clutch disk 35 by the cam 33 cooperating with supporting structure for the arm 36, omitted for the sake of clarity. The arm 36 is thus moved through an angle proportional to the deflection of the pointer 25a and is then released by the cam 33 to reengage the clutch disk 35. Rotating cams 38 then engage that particular one of the cam surfaces 37 which has moved upwardly and returns the arm 36 to its normally horizontal position, at the same time moving the clutch disk 35, the connected slidewire 17, and mercury switch 43 through a corresponding angle.

The operation of the system as a whole will be described, assuming, as the initial condition, that the furnace 10 has been operating at substantially its normal temperature, but that the circuit of the heating element 11 has been broken by the switch 43. Under these conditions, as the furnace 10 cools, the thermo-electromotive force of the thermo-couple 13 correspondingly decreases with the result that it is no longer equal to the electromotive force derived from the potentiometer 14 for the particular setting of the contact 18. The galvanometer 25 then deflects in such a direction that the rebalancing mechanism 15 adjusts the slidewire 17 with respect to the contact 18 to rebalance the circuit. Such rebalancing or readjustment is made once for each rotation of the shaft 28. When the temperature of the furnace departs from the desired value by a predetermined magnitude, the mercury switch 43 will have been operated through an angle sufficient to close its circuit and energize the heating element 11 of the furnace 10. The temperature of the furnace now rises until it exceeds the desired value by an amount such that the rebalancing mechanism 15 operates the mercury switch 43 through a sufficient angle in the opposite direction to open the circuit of the heating element 11. The above described cycle is, obviously, repeated to maintain substantially the desired temperature in the furnace 10.

From the foregoing, it is clear that, under normal operating conditions, the measuring circuit 14 is repeatedly rebalanced so that no current flows through the galvanometer 25 and its deflection is zero, and as long as the temperature of the furnace 10 stays at the desired value, the measuring circuit 14 will remain in a balanced condition.

However, should the circuit of the thermocouple 13 become open, as by a failure of the thermocouple, and neglecting the resistance element 9, the circuit of the galvanometer 25 would be opened, so that it would not deflect for any abnormal temperature conditions of the furnace 10; that is, the system would give an apparent indication that the temperature of the furnace 10 was normal while, in fact, it might depart considerably from normal. However, by the inclusion of the resistance element 9 connected between the junction of the resistances 20 and 21 and a terminal of the galvanometer 25, the potential drop across the resistance 21 is effective to circulate a current through the resistance 9 and the galvanometer 25, and the direction of this current is the same as that produced by the electromotive force of the thermocouple 13, thus producing an apparent indication of rising temperature when the circuit of the thermocouple 13 becomes open. The rebalancing mechanism 15, under these circumstances, operates as though the temperature of the furnace 10 were rising and rotates the switch 43 through an angle sufficient to open the circuit of the heating element 11 to prevent an excessive rise of furnace temperature.

During normal operation of the system, however, the safety resistance element 9 has no effect on the measuring circuit 14 other than slightly to offset the zero position of the adjustable contact 18. Since the rebalancing mechanism 15 always adjusts the slidewire 17 so that the galvanometer 25 is deenergized, the contact 18, for zero electromotive force of the thermocouple 13, will occupy such a position on the slidewire 17 that the difference in potential between the contact 18 and the upper terminal of the galvanometer is equal and opposite to that across the resistance element 21.

The voltage drop across resistance 21, which exists regardless of balance or unbalance of the network, continuously supervises the continuity of the circuit from the galvanometer through resistance 26, thermocouple 13, and contact 18 to the slidewire 17; so long as that circuit is complete, the monitoring effect of resistance 21 does not influence the control action but upon interruption of the circuit, the monitoring effect causes operation of switch 43, or equivalent, in a predetermined safe sense.

In normal operation, the effective slidewire voltage has two components, one of which is equal and opposite to the thermocouple voltage and the other of which is always equal and opposite to the fixed voltage drop across resistance 21; upon derangement of the automatic control system by interruption of the circuit from the galvanometer through the thermocouple to slidewire 17, the last-named component of the effective slidewire voltage is not capable of opposing the continuous monitoring effect of resistance 21 which thereupon assumes control and effects a predetermined safe operation of switch 43, or equivalent.

While it is understood that the values of the several resistance elements of the measuring circuit and other constants of the system will be determined in accordance with the operating conditions and characteristics of the furnace and the thermocouple involved, there is given herewith the constants of a particular circuit which has operated satisfactorily in accordance with my invention:

Thermocouple 13, range 200 to 2000°
F_____millivolts__ 4.92–64.08
Resistance element 16_____ohms__ 3.56
Resistance elements 17–19_____do____ 191
Resistance element 20_____do____ 2.49
Resistance element 21_____do____ 0.2
Resistance element 22_____do____ 204
Galvanometer 25 _____do____ 100
Resistance element 26_____do____ 150
Thermocouple 13_____do____ 15

While, in the system described above, the control of the temperature of the furnace 10 is effected by an opening and closing of the circuit of the heating element 11 by the switch 43, in which case it is desirable that the heating element 11 shall have sufficient capacity to raise the temperature of the furnace 10 above the desired value under any load conditions, it will be obvious to those skilled in the art that the heating element 11 may be merely a marginal or auxiliary heating element, or that the temperature of the furnace may be controlled by the rebalancing apparatus 15 by any well-known direct or intermediate controlling mechanism or apparatus.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim is:

1. A control system comprising a thermocouple responsive to a temperature to be controlled, means including an electro-responsive device connected in circuit with said thermocouple for measuring said temperature, relay apparatus controlled by said measuring means for controlling said temperature, and means operative, upon the opening of the thermocouple circuit, to maintain a current through said device for reducing said temperature below a predetermined value.

2. A control system comprising a thermocouple responsive to a temperature to be controlled, a potentiometer, a circuit including an electro-responsive device and said thermocouple connected in circuit with said potentiometer, means controlled by said device for controlling said temperature, and an auxiliary circuit connected with said potentiometer and effective, upon opening of the thermocouple circuit, to maintain a current through said device for modifying the control of said condition.

3. A control system comprising a thermocouple responsive to a temperature to be controlled, a potentiometer, a circuit including an electro-responsive device and said thermocouple connected in circuit with said potentiometer, means controlled by said device for controlling said temperature, and an auxiliary high resistance circuit connected from a terminal of said electro-responsive device to a point of said potentiometer of such potential as to tend to send through said device a current of the same sense as that due to said thermocouple.

4. A control system for normally maintaining a predetermined magnitude of a condition comprising means for producing a voltage which increases with increase in magnitude of said condition, electro-responsive means responsive to increase of said voltage to decrease the magnitude of said condition, and auxiliary means for continuously producing a voltage simulating a magnitude of said condition higher than said predetermined magnitude to effect, when said first-named means is unable to affect said electro-responsive means in response to changes in magnitude of said condition, a reduction in the magnitude of said condition by said electro-responsive means.

5. A control system comprising means for producing an electrical effect which increases with increase in magnitude of a condition and which decreases to zero when said means is inoperative, a network including said means, means for controlling the magnitude of said condition, electro-responsive means for effecting adjustment of said control means in one sense when said effect is higher than a predetermined magnitude and in an opposite sense when said effect is lower than a predetermined magnitude, and auxiliary means, effective when said first means is inoperative, to produce an effect upon said electro-responsive means simulating a magnitude of said condition higher than said predetermined magnitude to effect operation of said control means.

6. A control system comprising means for controlling the magnitude of a condition, a network, electro-responsive means for effecting actuation of said control means connected between points in said network having such potentials that it tends to effect operation of said control means in one predetermined sense, irrespective of the existing magnitude of the condition, and means for producing a voltage varying with changes in magnitude of said condition connected from said electro-responsive means to a point in said network of such potential that when said condition is of the desired magnitude the aforesaid tendency of said electro-responsive means is balanced.

7. A control system comprising a network, a thermocouple responsive to changes in magnitude of a temperature to be controlled, a galvanometer, means responsive to deflection of said galvanometer for controlling said temperature, said thermocouple and galvanometer being connected in series between points in said network of such relative potential that when said temperature is of the desired magnitude the current through said galvanometer is in such direction that the galvanometer tends to deflect in the direction effecting temperature-increasing operation of said control means, and means for effecting flow of current through said galvanometer which is equal and opposite to said first-named current at the desired temperature and which is effective upon open circuiting of the thermocouple to cause said galvanometer to deflect in the direction effecting temperature-decreasing operation of said control means.

8. A control system comprising a split-circuit potentiometer, a thermocouple responsive to changes in magnitude of a condition, a galvanometer connected in series with said thermocouple between points in different branches of said potentiometer circuit, a resistance connected from one terminal of said galvanometer to a point in the same branch of the potentiometer to which the other terminal of said galvanometer is connected, and a resistance connected between said two points in the said same branch, the voltages across said resistances being substantially equal and opposite at a predetermined magnitude of said condition, and the voltage across said second resistance being effective when said thermocouple is open-circuited to effect deflection of said galvanometer in a predetermined direction.

9. A control system comprising a normally balanced network including means responsive to changes in magnitude of a condition, means for controlling the magnitude of said condition, electro-responsive means adapted to effect operation of said control means in one direction when the magnitude of said condition is in excess of a predetermined magnitude and in an opposite direction when the magnitude of said condition is less than said predetermined magnitude, said network being of such type that said electro-responsive means is inactive when said responsive means is inoperative, and auxiliary means which renders said electro-responsive means active in a desired sense when said responsive means is inoperative to effect the balance of said network upon change in magnitude of the condition.

10. A control system comprising a network having two points always of different potential, a galvanometer, connections from said galvanometer to said points including means producing a voltage varying with changes in magnitude of a condition, means for changing the magnitude of said condition in opposite senses for opposite senses of deflection of said galvanometer, and means for producing deflection of said galvanometer in a predetermined direction when the connection from said galvanometer to one of said points including said voltage producing means is interrupted.

11. A control system comprising a network, means for producing an electrical effect varying with changes in magnitude of a condition, electro-responsive means, the normal operation of which is dependent upon continuity of a circuit between points of said network completed by said first means, means controlled by said electro-responsive means normally to maintain a predetermined magnitude of said condition, and means effective, upon interruption of said circuit, to energize said electro-responsive means in a predetermined sense.

12. A control system comprising a network, means for producing an electrical effect varying with changes in magnitude of a condition, electro-responsive means responding in opposite senses for magnitudes of said condition higher and lower than a predetermined magnitude, control means for varying the magnitude of said condition in accordance with the sense of response of said responsive means, the normal operation of said responsive means being dependent upon a connection to said network including said first means, and means effective, upon interruption of said connection, to energize said electro-responsive means in a predetermined sense.

13. A control system comprising an electro-responsive device, means for producing a voltage whose magnitude is a function of the magnitude of a condition to be controlled, safety means for producing a voltage continuously tending to effect response of said device in a predetermined sense, potentiometer means for producing a voltage normally balancing the sum of said first two voltages to effect null response of said device, and control means controlled by said device normally to maintain a predetermined magnitude of said condition, said safety means, when its voltage is the only or predominating voltage effective to produce response of said device, effecting operation of said control means in a safe sense.

14. A control system comprising an electro-responsive device, means for producing an electrical effect whose magnitude is a function of the magnitude of a condition to be controlled, safety means for producing an electrical effect continuously tending to effect response of said device in a predetermined sense, potentiometer means for producing an electrical effect normally balancing the summation of said two first-named effects upon said responsive device, and control means controlled by said device, normally to maintain a predetermined magnitude of said condition, in a sense, such that the system is rendered safe in event of a failure therein, when the effect of said safety means is the only or predominating effect applied to said device.

15. A control system comprising a network, an electro-responsive device connected, in series with an impedance, in a path between points of said network which are continuously of different potentials, means for producing a voltage whose magnitude is a function of the magnitude of the controlled condition included in a second path from a point in said first path to a point in said network whose potential is beyond the range of the potentials of said first-named points, and means controlled by said responsive device normally to maintain a predetermined magnitude of said condition, and operated in a predetermined sense upon occurrence of significant increase in the resistance of said second path.

16. A control system comprising a network, means for unbalancing said network upon change in magnitude of condition, electrical means responsive to unbalance of said network included in series with said first-named means in a branch circuit of said network, means normally controlled by said electro-responsive means to maintain a predetermined magnitude of said condition, and safety means, including an auxiliary circuit connected to said network, effective upon interruption of said branch circuit to effect operation of said controlled means in a sense such that the system is rendered safe.

17. A control system comprising a network, means for unbalancing said network upon change in magnitude of a condition, electrical means, responsive to unbalance of said network, included in series with said means in a branch circuit of said network, means normally controlled by said electro-responsive means to maintain a predetermined magnitude of said condition, and safety means for producing electromotive forces which are in balanced opposition so long as said branch circuit is complete and one of which is effective upon interruption of said branch circuit to effect operation of said controlled means in such sense that the system is rendered safe.

18. The combination with an automatic control system comprising a balanceable measuring network, electrical means responsive to unbalance of said network, and control means controlled by said electro-responsive means, of a monitor circuit cooperatively related to said network assuming control of said control means in event of derangement of said measuring network arising from accidental interruption of the continuity of a current path in said network.

19. The combination with an automatic control system comprising a balanceable measuring network, electrical means responsive to unbalance of said network and unresponsive when said network is either balanced or deranged by open-circuiting of a current path thereof, and control means controlled by said electro-responsive means, of a monitor circuit cooperatively related to said network assuming control of said control means in event of said derangement of said measuring network.

20. A control system circuit network including means for producing one voltage whose magnitude is a function of the magnitude of a condition to be controlled and safety means for producing a second voltage and potentiometer means for producing a third voltage and an electro-responsive device controlling the operation of said potentiometer means and normally subject to an energizing action which is the resultant of a function of said second voltage and of a function of the difference between said first and third voltages and normally causes said potentiometer means to vary said third voltage as required to make said resultant too small for the operative energization of said device, and control means controlled by said device normally to maintain a predetermined magnitude of said condition, said device controlling said control means for operation in a safe sense when the energizing action to which said device is subjected is wholly or predominantly a function of said second voltage.

21. A control system including means for producing an electrical effect whose magnitude is a function of the magnitude of a condition to be controlled, safety means for producing a second electrical effect, a network for producing a third electrical effect, electro-responsive means normally energized in accordance with a resultant effect of magnitude and sense determined by said three electrical effects, and control means controlled by said device normally to maintain a predetermined magnitude of said condition and controlled by said device for operation in a safe sense when said device is energized in accordance with said second electrical effect.

22. A control system comprising a network, means for producing an electrical effect varying with changes in magnitude of a condition, electro-responsive means, the normal operation of which is dependent upon continuity of a circuit between points of said network completed by said first means, means controlled by said electro-responsive means normally to maintain a predetermined magnitude of said condition, and safety means producing a voltage effective upon interruption of said circuit to effect operation of said controlled means in a safe sense.

FELIX WUNSCH.

Disclaimer 2,153,222.—*Felix Wunsch*, Philadelphia, Pa. CONTROL SYSTEM. Patent dated Apr. 4, 1939. Disclaimer filed Nov. 29, 1949, by the assignee, *Leeds and Northrup Company*.

Hereby enters this disclaimer to claims 4, 5, 11, and 22 of said patent.
[*Official Gazette December 27, 1949.*]

Disclaimer

2,153,222.—*Felix Wunsch*, Philadelphia, Pa. CONTROL SYSTEM. Patent dated Apr. 4, 1939. Disclaimer filed Nov. 29, 1949, by the assignee, *Leeds and Northrup Company*.

Hereby enters this disclaimer to claims 4, 5, 11, and 22 of said patent.
[*Official Gazette December 27, 1949.*]

Disclaimer 2,153,222.—*Felix Wunsch*, Philadelphia, Pa. CONTROL SYSTEM. Patent dated Apr. 4, 1939. Disclaimer filed Aug. 5, 1950, by the assignee, *Leeds and Northrup Company*.

Hereby enters this disclaimer to claim 1 of said patent.
[*Official Gazette September 12, 1950.*]